Figure 1:
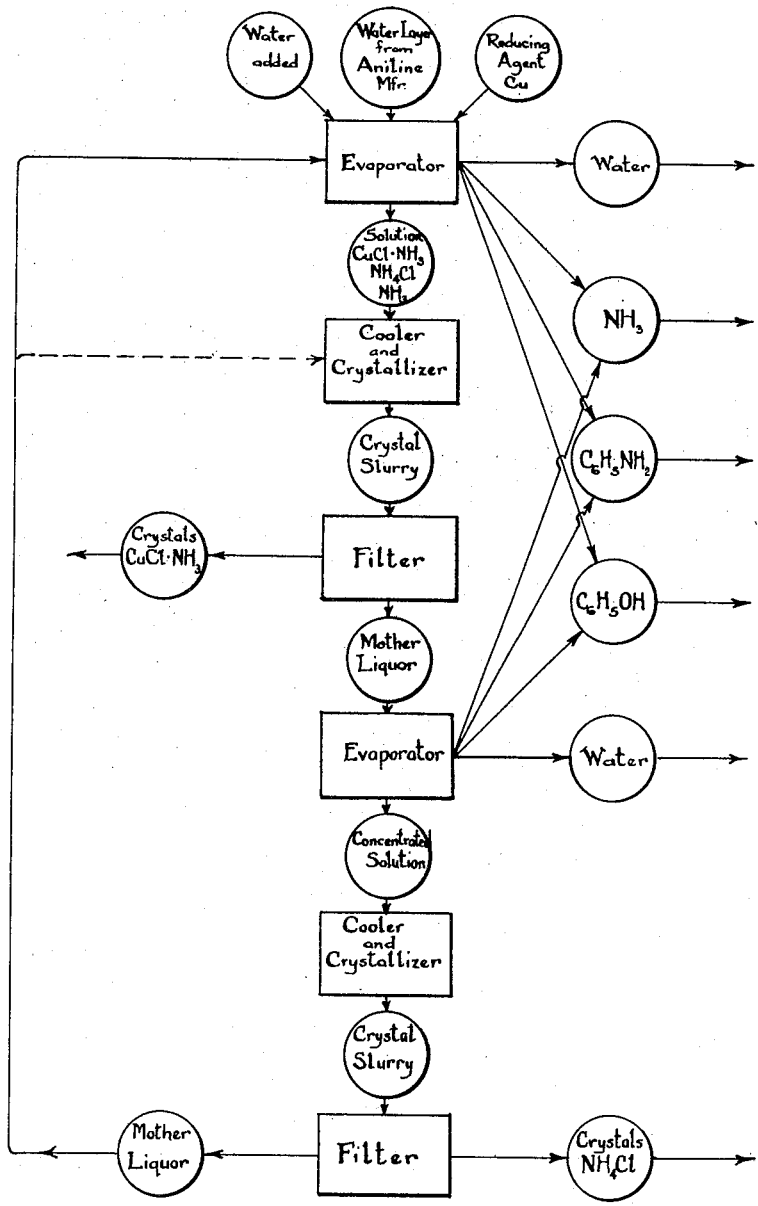

Patented July 14, 1931

1,814,822

UNITED STATES PATENT OFFICE

EDGAR C. BRITTON AND HAROLD R. SLAGH, OF MIDLAND, MICHIGAN, ASSIGNORS TO THE DOW CHEMICAL COMPANY, OF MIDLAND, MICHIGAN, A CORPORATION OF MICHIGAN

SEPARATION OF CUPROUS AND AMMONIUM CHLORIDES

Application filed May 5, 1930. Serial No. 449,766.

This invention relates to methods for separating cuprous chloride and ammonium chloride by crystallization from aqueous solutions containing the same, and is particularly concerned with the separation and recovery thereof from aqueous liquors resulting from the process for making an arylamine by reaction of a chlorinated aromatic hydrocarbon and aqueous ammonia solution.

In the process just referred to one mole of a chlorinated aromatic hydrocarbon, e. g. chlorobenzene, is reacted with an excess, e. g. about 5 moles, of ammonia in 28 to 30 per cent. solution by heating under pressure at a temperature between 150° and 250° C., according to the equation;

For facilitating the reaction about 0.1 to 0.2 mole of a cuprous compound, e. g. cuprous oxide, is added to the reaction mixture. When the reaction is complete, the product is discharged from the reactor into a suitable receiver wherein it separates into two liquid layers, one containing the arylamine product together with unreacted chlorobenzene and the other aqueous layer containing excess ammonia, ammonium chloride and cuprous chloride together with a small amount of dissolved arylamine and phenol. It is with such water layer that the present invention has chiefly to do, and it is an object thereof to provide improved procedure for the separation and recovery of the constituents of the water layer, and more particularly for the separation of ammonium chloride and cuprous chloride therefrom.

We have now found that cuprous chloride may be crystallized from the above solution under appropriate conditions as a double compound with ammonia, cuprous monoamino-chloride having the formula $CuCl.NH_3$, while from the mother liquor of the first crystallization, after concentrating, ammonium chloride may be crystallized in a high degree of purity. The invention, then, consists of the steps constituting our improved process hereinafter fully described and particularly pointed out in the claims, the annexed drawing and following description setting forth but a few of the various ways in which the principle of the invention may be used.

In said annexed drawing:

The single figure is a flow sheet illustrating the sequence of steps and movement of materials in the process.

The water layer derived from the production of aniline, which may be taken as an example of a solution to be worked up according to the process of our invention, has the following approximate composition:

| | Per cent |
|---|---|
| $NH_3$ | 12 –15 |
| $NH_4Cl$ | 13 –20 |
| $CuCl$ | 8 –15 |
| $C_6H_5.NH_2+C_6H_5OH$ | 1. 5– 3 |

Such water layer has heretofore been worked up by adding an alkali to decompose the ammonium chloride and precipitate cuprous oxide or hydroxide, distilling off free ammonia and aniline, and filtering off the precipitate of cuprous oxide and hydroxide to be used over again in the process. By such treatment the valuable by-product ammonium chloride is not recovered as such, but is reconverted to ammonia. Consequently the chlorine content of the chlorobenzene reacted is lost, while a considerable consumption of alkali is necessitated by the mode of treatment employed.

Our improved process avoids all of the aforesaid disadvantages and in a simple and direct way which leads to important economies in the general process for making aniline or other arylamines. Such process is based upon our discovery that the aforesaid cuprous monoamino-chloride, $CuCl.NH_3$, is difficultly soluble in a cold dilute solution of ammonium chloride containing a slight excess of ammonia. By crystallizing out as such double compound, the cuprous chloride content of the above mentioned water layer is recoverable directly without employing any alkali, leaving a solution of ammonium chloride which in turn can be worked up by crystallization methods to yield a product of high purity.

It is known that a series of double compounds of cuprous chloride with both ammonia and ammonium chloride exist, but all such compounds have hitherto been difficult to prepare in pure form and the constitution of at least some of them has been in doubt. Previous to our discovery it was not known that cuprous chloride could be almost quantitatively separated from a solution containing ammonium chloride by crystallizing out as cuprous monoaminochloride, $CuCl.NH_3$, in the presence of a slight excess of ammonia. The crystals are colorless when first formed, but on account of their sensitiveness to oxidation are quickly turned green or blue on the surface, even upon slight exposure to the air. They may be dried without oxidation in an atmosphere of nitrogen, hydrogen or other inert gas. Analysis of the dried crystals has confirmed the constitution assigned to them, as shown by the following results:

|  | Found | Calc. |
| --- | --- | --- |
|  | Per cent | Per cent |
| Cu | 54.80 | 54.80 |
| Cl | 30.65 | 30.57 |
| $NH_3$ | 14.70 | 14.66 |

The operation of our improved process may be understood by reference to the flow sheet. The water solution product from the aniline reaction, having the approximate composition already given, is charged into an evaporator and distilled in absence of air. This is essential in order to avoid oxidation of cuprous to cupric chloride, in which form the copper escapes crystallization as a double compound with ammonia and later comes out as an impurity in the ammonium chloride crystals. After charging the evaporator the air remaining therein is displaced by steam or other inert gas or vapor and a small amount of a reducing agent, preferably metallic copper, is added to the solution as an extra precaution to prevent oxidation. In the distillation free ammonia and water vapor are evolved, accompanied by a portion of the aniline and phenol present, such distilled products being collected and separated as in the known process. The distillation is continued until the free ammonia content has been reduced to a figure slightly in excess of a molecular equivalent of the cuprous chloride present. In practice we have found that by evaporating at atmospheric pressure until the still-head temperature reaches 97° C. a satisfactory composition is attained. Thereupon water is added to the solution in the evaporator in amount approximately equivalent to that evaporated, so as to dilute the solution sufficiently to prevent crystallization of ammonium chloride along with the cuprous amino-chloride in the succeeding step. When working with more dilute solutions, however, the quantity of water added may be reduced, or its addition dispensed with entirely, depending upon the concentration of the solution after the first evaporation. In general the solution composition is to be adjusted at this stage to hold the ammonium chloride content thereof below about 20 per cent.

After thus diluting, if such is required, the solution is transferred to a crystallizer wherein it is cooled to a temperature below about 60° C., conveniently to room temperature or about 25° C. and crystals of $CuCl.NH_3$ are deposited. The crystal slurry is pumped to an enclosed filter press, the crystals are separated from the mother liquor and, if desired, washed with ammonia water. The preceding operations are likewise to be conducted so as to avoid exposure to air and thereby prevent oxidation, employing suitably enclosed types of apparatus and maintaining therein an atmosphere of nitrogen or other inert gas. The crystals after separation may be returned to the original process for the production of aniline to supply the catalytic cuprous compound therein, or converted to cuprous oxide by treatment with an alkali and the ammonia content thereof recovered, or they may be further disposed of in any desired manner. From 80 to 90 pr cent. of the copper content of the original solution may readily be removed in this way.

The mother liquor from the crystallization of the cuprous chloride-ammonia compound, containing the ammonium chloride, excess ammonia and residual amounts of cuprous chloride, aniline and phenol, is then evaporated, preferably out of contact with air, to saturation with respect to ammonium chloride at a temperature materially above room temperature, for example to a temperature of about 118° C. at atmospheric pressure or under reduced pressure at a correspondingly lower temperature. The residual ammonia, aniline and phenol are distilled off thereby and recovered. The concentrated solution is cooled to about room temperature, preferably in a mechanical crystallizer, and the crystals of ammonium chloride are filtered from the mother liquor. From 60 to 70 per cent. of the ammonium chloride content of the solution may be crystallized out directly as light colored crystals containing not more than about 1.0 per cent, or less of copper as impurity. A higher copper content in the ammonium chloride crystals at this point indicates excessive oxidation in the preceding steps. The mother liquor containing the balance of the ammonium chloride and cuprous chloride is returned to the solution from the first evaporation step of the process, being introduced either directly to the evaporator or to the cooler. By recycling the mother liquor in this way, a relatively constant amount of the two salts is retained in process, thereby enabling a nearly quantitative recovery thereof to be maintained under continuous operation. Under proper control there is no accumulation of salts in mother liquors nor any material losses from the process except for the copper content of the ammonium chloride crystals. With continuous operation the ultimate yield of cuprous chloride, as $CuCl.NH_3$, and of ammonium chloride is independent of the crystallization temperature below about 60° C. actually employed, such temperature merely determining the inventory of dissolved salts carried in the mother liquors, although it is advisable to employ about the same temperatures for both crystallizing steps. Thus crystallization may be carried out at temperatures above room temperature, even as high as 60° C., or by employing artificial cooling temperatures below room temperature may be utilized, if so desired.

Purification of the ammonium chloride crystals is readily carried out by dissolving in hot water, treating with hydrogen sulphide or ammonium sulphide to precipitate the copper as sulphide, which is filtered off, and recrystallizing from the cooled solution. The mother liquors may be constantly recycled in such purification treatment or they may be returned to the principal process. A fine grade of white crystals of ammonium chloride is obtained, equal to the best commercial grades.

The aqueous solution resulting from the preparation of other arylamines by reaction of a chlorinated aromatic hydrocarbon and ammonia may be worked up in similar manner for the recovery of the products contained therein. The invention is likewise applicable to the separation of cuprous chloride and ammonium chloride in any solution containing the same from whatever source derived, by adding the requisite amount of ammonia thereto and proceeding as herein described. The excess of ammonia to be employed varies somewhat with the relative proportions of cuprous chloride and ammonium chloride in the solution to be treated, but in general should be between 10 and 60 per cent. over and above the amount required to combine with the cuprous chloride to form the monoamino-chloride. If less is used the crystallization of the latter salt will be less complete, while if a greater excess is employed apparently there is a tendency to the formation of a double compound of higher ammonia content which is more soluble and cannot be crystallized out and separated in the manner herein described.

Other modes of applying the principle of our invention may be employed instead of the one explained, change being made as regards the process herein disclosed, provided the step or steps stated by any of the following claims or the equivalent of such stated step or steps be employed.

We therefore particularly point out and distinctly claim as our invention:—

1. The process of separating cuprous chloride and ammonium chloride from an aqueous solution containing the same which comprises establishing therein a free ammonia content in excess of one molecular equivalent of the cuprous chloride present, crystallizing cuprous monoamino-chloride, $CuCl.NH_3$, therefrom separating the crystals and crystallizing ammonium chloride from the mother liquor.

2. The process of separating cuprous chloride and ammonium chloride from an aqueous solution containing the same which comprises establishing therein a free ammonia content in excess of one molecular equivalent of the cuprous chloride present and an ammonium chloride content below about 20 per cent. by weight, causing cuprous monoamino-chloride, $CuCl.NH_3$, to crystallize therefrom, separating the crystals and crystallizing ammonium chloride from the mother liquor.

3. The process of separating cuprous chloride and ammonium chloride from the aqueous ammoniacal solution resulting from the reaction between monochlorobenzene and ammonia which comprises establishing in such solution a free ammonia content in excess of one molecular equivalent of the cuprous chloride present and a content of ammonium chloride below about 20 per cent. by weight, crystallizing cuprous monoamino-chloride, $CuCl.NH_3$, therefrom, separating the crystals and crystallizing ammonium chloride from the mother liquor.

4. The process of separating cuprous chloride and ammonium chloride contained in the aqueous ammoniacal solution resulting from the reaction between a chlorinated aromatic hydrocarbon and ammonia which comprises crystallizing such cuprous chloride therefrom as cuprous monoamino-chloride, $CuCl.NH_3$, separating the crystals and then crystallizing ammonium chloride from the mother liquor.

5. The process of separating cuprous chloride and ammonium chloride contained in the aqueous ammoniacal solution resulting from the reaction between a chlorinated aromatic hydrocarbon and ammonia which comprises evaporating to drive off a portion of the ammonia and leave an excess of from 10 to 60 per cent. thereof over one molecular equivalent of the cuprous chloride present, cooling to crystallize cuprous monoaminochloride, $CuCl.NH_3$, separating the crystals and crystallizing ammonium chloride from the mother liquor.

6. The process of separating cuprous chloride and ammonium chloride contained in the aqueous ammoniacal solution resulting from the reaction between a chlorinated aromatic hydrocarbon and ammonia which comprises evaporating to drive off a portion of the ammonia and leave an excess of from 10 to 60 per cent. thereof over one molecular equivalent of the cuprous chloride present, diluting with water to adjust the ammonium chloride content below about 20 per cent. by weight, cooling to crystallize cuprous monoaminochloride, $CuCl.NH_3$, separating the crystals and crystallizing ammonium chloride from the mother liquor.

7. The process of separating cuprous chloride and ammonium chloride contained in the aqueous ammoniacal solution resulting from the reaction between a chlorinated aromatic hydrocarbon and ammonia which comprises evaporating to drive off a portion of the ammonia and leave an excess of from 10 to 60 per cent. thereof over one molecular equivalent of the cuprous chloride present, cooling to crystallize cuprous monoaminochloride, $CuCl.NH_3$, separating the crystals, concentrating the mother liquor by evaporation and cooling to crystallize ammonium chloride therefrom.

8. The process of separating cuprous chloride and ammonium chloride contained in the aqueous ammoniacal solution resulting from the reaction between a chlorinated aromatic hydrocarbon and ammonia which comprises evaporating to drive off a portion of the ammonia and leave an excess of from 10 to 60 per cent. thereof over one molecular equivalent of the cuprous chloride present, diluting with water to adjust the ammonium chloride content below about 20 per cent. by weight, cooling to crystallize cuprous monoamino-chloride, $CuCl.NH_3$, separating the crystals, concentrating the mother liquid by evaporation, and cooling to crystallize ammonium chloride therefrom.

9. The process of separating cuprous chloride and ammonium chloride contained in the aqueous ammoniacal solution resulting from the reaction between a chlorinated aromatic hydrocarbon and ammonia which comprises evaporating to drive off a portion of the ammonia and leave an excess of from 10 to 60 per cent. thereof over one molecular equivalent of the cuprous chloride present, diluting with water to adjust the ammonium chloride content below about 20 per cent. by weight, cooling to crystallize cuprous monoamino-chloride, $CuCl.NH_3$, separating the crystals, concentrating the mother liquor by evaporation, cooling to crystallize ammonium chloride therefrom, separating the crystals and returning the final mother liquor to the solution from the first evaporation step.

10. The process of separating cuprous chloride and ammonium chloride contained in the aqueous ammoniacal solution resulting from the reaction between a chlorinated aromatic hydrocarbon and ammonia which comprises evaporating to drive off a portion of the ammonia and leave an excess of from 10 to 60 per cent. thereof over one molecular equivalent of the cuprous chloride present, cooling to a temperature below about 60° C., separating crystals of cuprous monoamino-chloride, further evaporating the mother liquor to saturation with respect to ammonium chloride at a temperature above about 60° C., cooling to a temperature below 60° C. and separating crystals of ammonium chloride.

11. The process of separating cuprous chloride and ammonium chloride contained in the aqueous ammoniacal solution resulting from the reaction between a chlorinated aromatic hydrocarbon and ammonia which comprises evaporating to drive off a portion of the ammonia and leave an excess of from 10 to 60 per cent. thereof over one molecular equivalent of the cuprous chloride present, cooling to a temperature below about 60° C., separating crystals of cuprous monoamino-chloride, further evaporating the mother liquor to saturation with respect to ammonium chloride at a temperature above about 60° C., cooling to a temperature below 60° C., separating crystals of ammonium chloride and returning the final mother liquor to the solution from the first evaporation step.

12. The process of separating cuprous chloride and ammonium chloride contained in the aqueous ammoniacal solution resulting from the reaction between a chlorinated aromatic hydrocarbon and ammonia which comprises evaporating to drive off a portion of the ammonia and leave an excess of from 10 to 60 per cent. thereof over one molecular equivalent of the cuprous chloride present, cooling to about room temperature, separating crystals of cuprous monoamino-chloride, further evaporating the mother liquid to saturation with respect to ammonium chloride at a temperature materially above room temperature, cooling to about room temperature and separating crystals of ammonium chloride.

13. The process of separating cuprous chloride and ammonium chloride contained in the aqueous ammoniacal solution resulting from the reaction between a chlorinated aromatic hydrocarbon and ammonia which comprises evaporating to drive off a portion of the ammonia and leave an excess of from 10 to 60 per cent. thereof over one molecular equivalent of the cuprous chloride present, cooling to about room temperature, separating crystals of cuprous monoamino-chloride, further evaporating the mother liquor to saturation with respect to ammonium chloride at a temperature materially above room temperature, cooling to about room temperature, separating crystals of ammonium chloride and returning the final mother liquor to the solution from the first evaporation step.

14. The process of separating cuprous chloride and ammonium chloride contained in the aqueous ammoniacal solution resulting from the reaction between a chlorinated aromatic hydrocarbon and ammonia which comprises evaporating to drive off a portion of the ammonia and leave an excess of from 10 to 60 per cent. thereof over one molecular equivalent of the cuprous chloride present, adding water to adjust the ammonium chloride content below about 20 per cent. by weight, cooling to about room temperature, separating crystals of cuprous monoamino-chloride, further evaporating the mother liquor to saturation with respect to ammonium chloride at a temperature materially above room temperature, cooling to about room temperature and separating crystals of ammonium chloride.

15. The process of separating cuprous chloride and ammonium chloride contained in the aqueous ammoniacal solution resulting from the reaction between a chlorinated aromatic hydrocarbon and ammonia which comprises evaporating to drive off a portion of the ammonia and leave an excess of from 10 to 60 per cent. thereof over one molecular equivalent of the cuprous chloride present, adding water to adjust the ammonium chloride content below about 20 per cent. by weight, cooling to about room temperature, separating crystals of cuprous monoaminochloride, further evaporating the mother liquor to saturation with respect to ammonium chloride at a temperature materially above room temperature, cooling to about room temperature, separating crystals of ammonium chloride and returning the final mother liquor to the solution from the first evaporation step.

16. The process of separating cuprous chloride from an aqueous solution containing the same and ammonium chloride which comprises adding ammonia thereto in amount of from 10 to 60 per cent. in excess of one molecular equivalent of the cuprous chloride present and crystallizing cuprous monoamino-chloride from the ammoniacal solution.

17. The process of separating cuprous chloride from the aqueous ammoniacal solution resulting from the reaction between a chlorinated aromatic hydrocarbon and ammonia which comprises evaporating to drive off a portion of the ammonia and leave an excess of from 10 to 60 per cent. thereof over one molecular equivalent of the cuprous chloride present and crystallizing cuprous monoamino-chloride therefrom.

Signed by us this 30 day of April, 1930.
EDGAR C. BRITTON.
HAROLD R. SLAGH.